(12) United States Patent
Driescher et al.

(10) Patent No.: US 6,750,488 B1
(45) Date of Patent: Jun. 15, 2004

(54) FOCAL PLANE PLATE FOR A HIGH-RESOLUTION CAMERA WITH LIGHT-SENSITIVE SEMICONDUCTOR SENSORS

(75) Inventors: Hans Driescher, Berlin (DE); Bernd Biering, Berlin (DE); Andreas Eckardt, Berlin (DE); Michael Greiner-Bär, Berlin (DE); Ute Grote, Berlin (DE); Stefan Hilbert, Zeuthen (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 0 days.

(21) Appl. No.: 09/376,442

(22) Filed: Aug. 18, 1999

(30) Foreign Application Priority Data

Aug. 18, 1998 (DE) .......................................... 198 38 362

(51) Int. Cl.[7] ..................... H01L 31/062; H01L 31/113; H01L 23/02; H01L 23/06; H01L 23/48
(52) U.S. Cl. .................... 257/292; 257/678; 257/684; 257/680; 257/690; 257/762; 257/741; 257/712; 257/714; 257/721; 257/729
(58) Field of Search .................. 257/292, 678, 257/680, 684, 690, 762, 741, 712, 714, 721, 729

(56) References Cited

U.S. PATENT DOCUMENTS 5,559,556 A   9/1996  Kagebeck ................... 348/374
5,731,834 A   3/1998  Huot et al. .................. 348/374
6,153,927 A * 11/2000  Raj et al. ..................... 257/680
6,611,050 B1 * 8/2003  Ference et al. ............. 257/679

FOREIGN PATENT DOCUMENTS

DE   19513678 A1   10/1996
DE   19626433 A1    1/1998
DE   19633868 A1    4/1998

OTHER PUBLICATIONS

Briess, et al., Analoge Echtzeitvorverarbeitung von WAOSS–Sensorsignalen, Heft 9/10, Bild & Ton Bd, 45(1992).

* cited by examiner

*Primary Examiner*—David E. Graybill
(74) *Attorney, Agent, or Firm*—Cohen, Pontani, Lieberman & Pavane

(57) ABSTRACT

A focal plane plate for a high-resolution camera with light-sensitive semiconductor sensors, includes an electrically nonconductive material for accommodating housed light-sensitive semiconductor sensors. Adjustment elements are arranged on the focal plane plate at arrangement locations of the housings of the light-sensitive semiconductor sensors, or the focal plane plate is designed with the adjustment elements. The adjustment elements are capable of being adapted in a complementary fashion to the form of the housings in the top sides of the light-sensitive semiconductor sensors lying in a common plane.

19 Claims, 5 Drawing Sheets

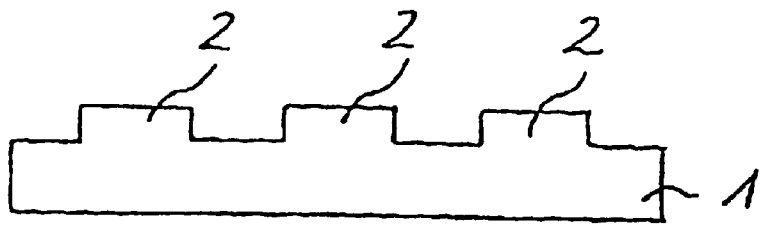
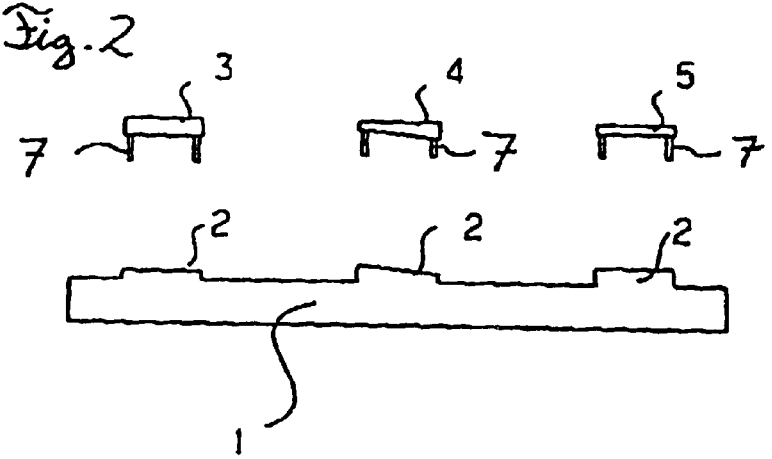
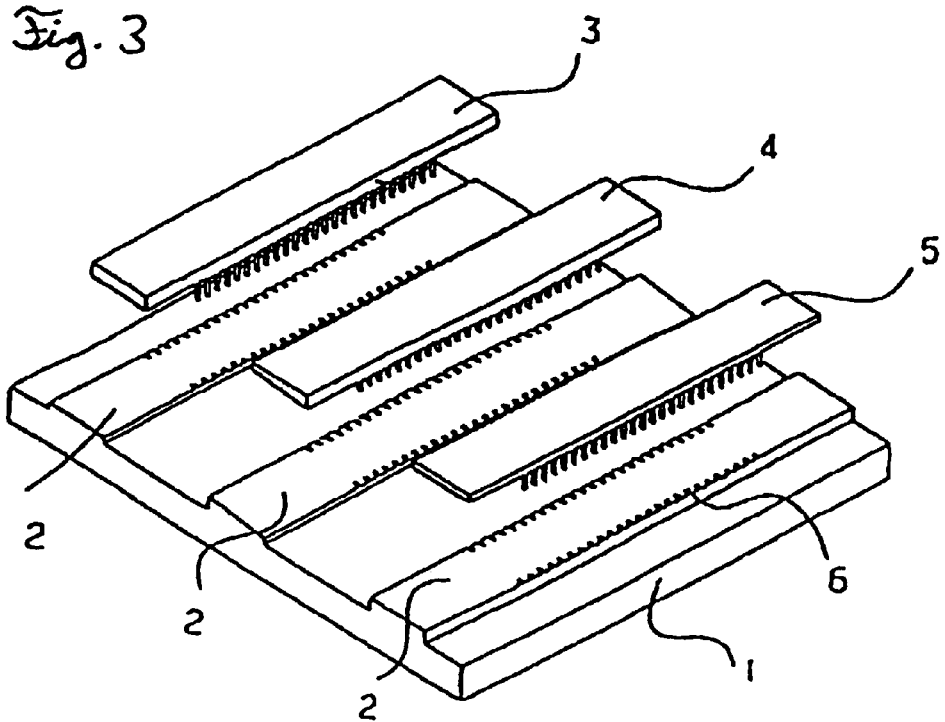

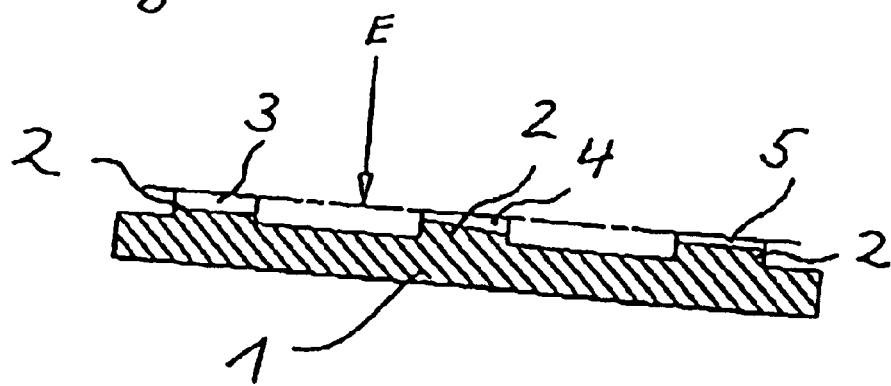
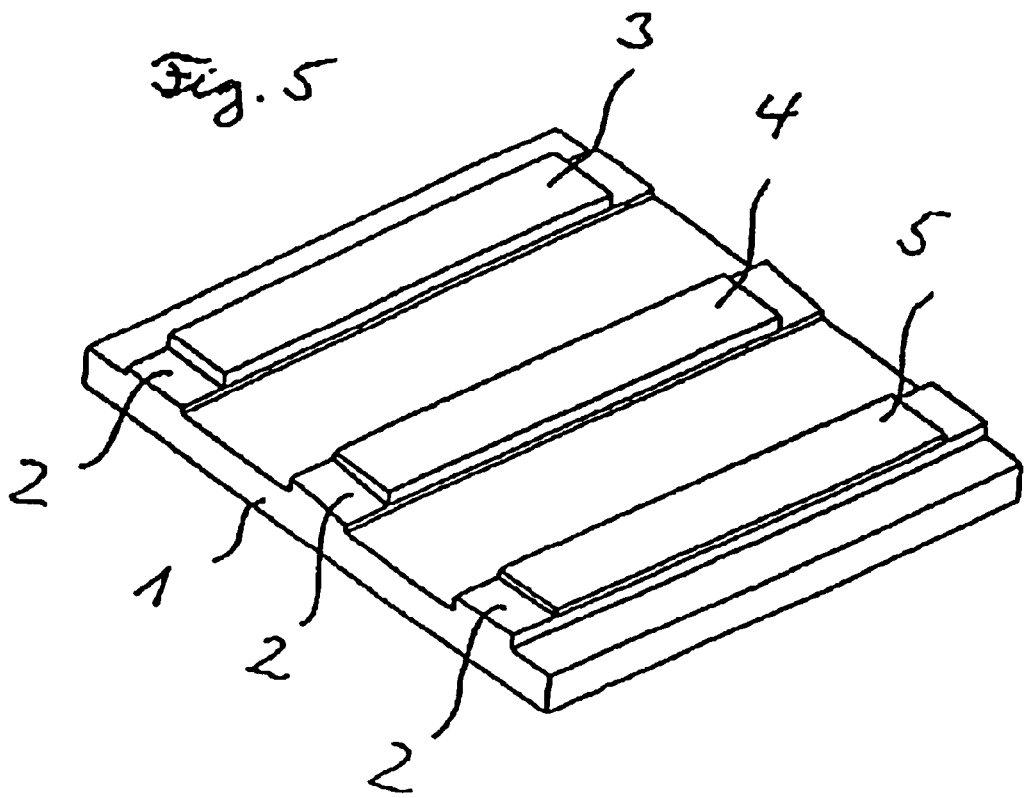

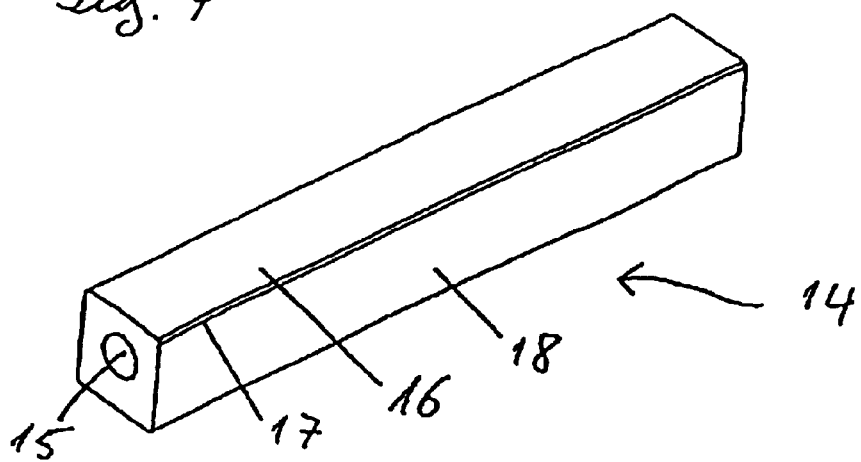
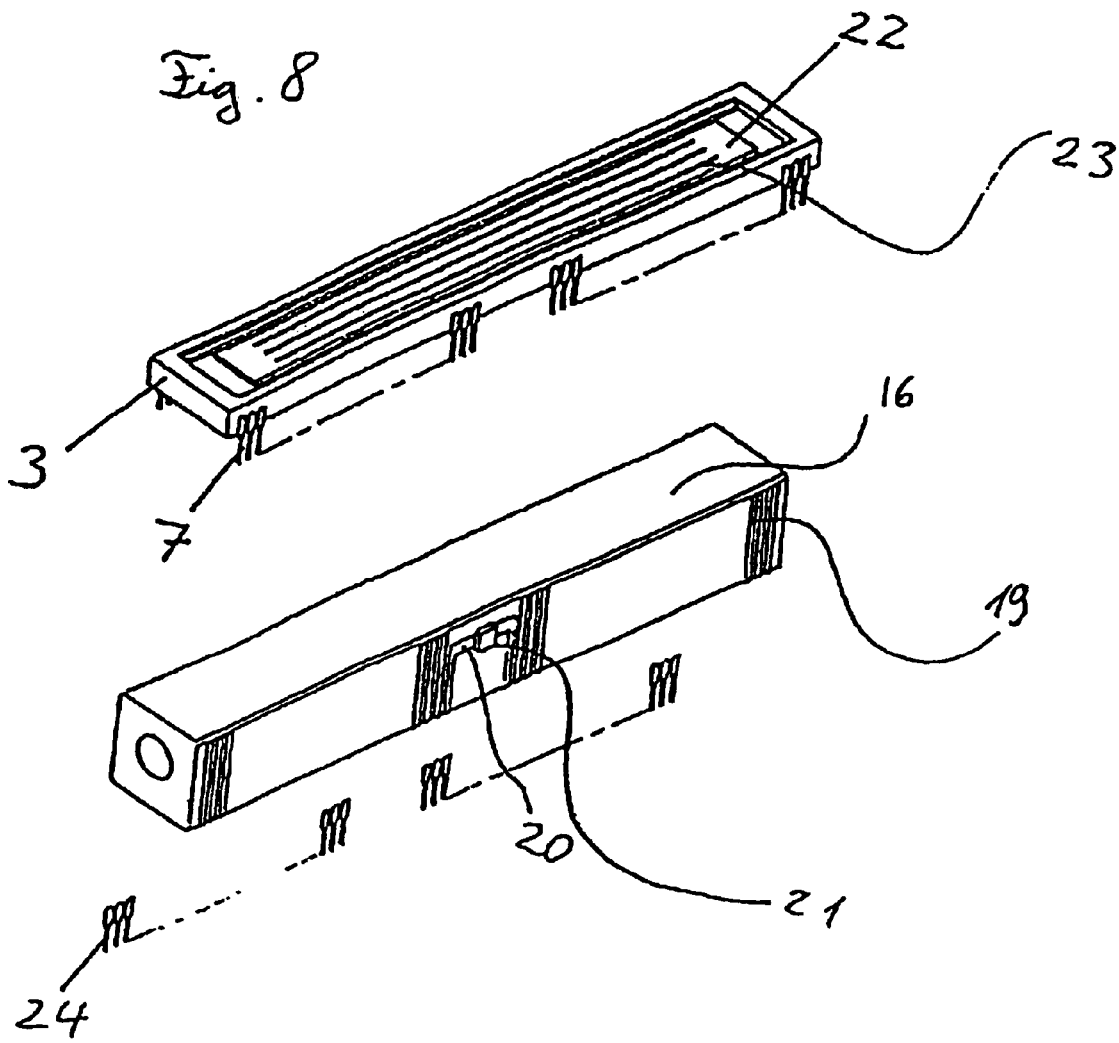

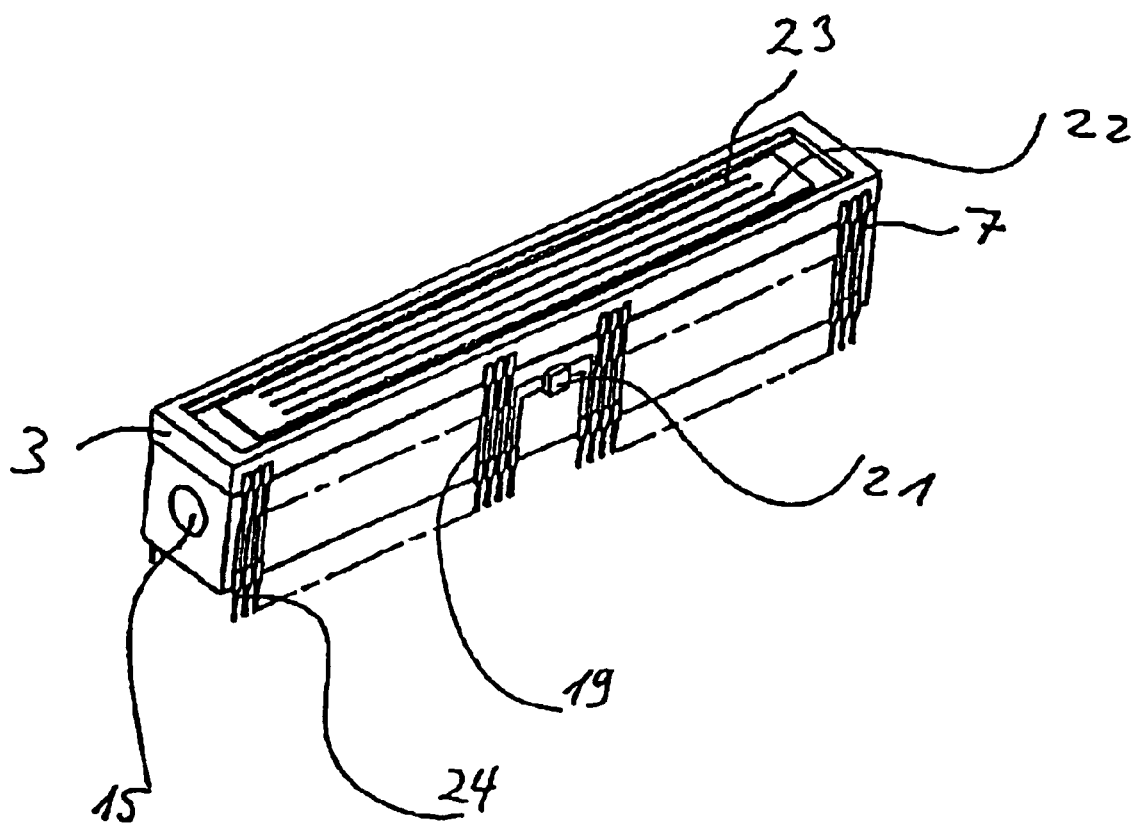

FOCAL PLANE PLATE FOR A HIGH-RESOLUTION CAMERA WITH LIGHT-SENSITIVE SEMICONDUCTOR SENSORS

BACKGROUND OF THE INVENTION

1. Field of the Invention

The invention relates to a focal plane plate for a high-resolution camera with light-sensitive semiconductor sensors, and to a method for adjusting the housed light-sensitive semiconductor sensors on the focal plane plate.

2. Description of the Related Art

High-resolution cameras with light-sensitive semiconductor sensors are used, for example, for aerial photographs, where they replace conventional aircraft cameras with large-format films. The light-sensitive semiconductor sensors are designed as CCD components in this case. "CMOS" cameras have also recently become known, and have been developed as an alternative to CCD cameras, which have been known for a long time. These and similar sensors can generally be referred to as light-sensitive semiconductor sensors. The problems described below in connection with CCD components also apply analogously to the other light-sensitive semiconductor sensors.

In a high-resolution CCD camera, the CCD component designed as a linear array or matrix and is arranged to that end in the film plane, i.e., the so-called focal plane, as a result of which the intermediate step of film developing that is required in conventional film cameras is obviated. The entire image information is available immediately on-line and in real time digitally. However, replacing the film of an aerial-photograph camera by a focal plane equipped with CCD components entails a variety of difficulties.

The CCD components and the electronics near the sensors consume electrical energy, which is converted to heat as power loss. In addition, they have to be operated with a constant operating temperature under very different ambient temperatures. These problems are currently resolved by constructing a special focal plane baseplate which is composed of a material which is compatible with respect to expansion with regard to the CCD chips made of silicon, and is coupled to a heat sink in order to keep the temperature of the focal plane constant. Such focal plane hybrids are equipped with chips that have already been separated and subjected to preliminary testing. As the number of pixels in the CCD linear arrays increases, the chips become very expensive to fabricate and are difficult to handle on account of their mechanical and electrostatic sensitivity. The few manufacturers globally which are able to produce CCD linear arrays with 12,000 or more pixels trade only in housed CCD linear arrays. Workers developing focal planes with high-resolution CCD linear arrays therefore have to work with housed linear arrays.

Conventional housed CCD components are produced carefully in mechanical terms; nevertheless, the tolerances between housing geometry and chip position are so large that when they are mounted on a planar surface, the image-recording pixels no longer form a planar surface. Rather, the deviations in the image plane are so large that sharp imaging of all the pixels in a linear array, as well as of corresponding pixels in different linear arrays, is no longer possible. In this case, the tolerances of the housings are of the order of magnitude of +/−250 µm. On account of the optical system, however, only deviations of approximately 10 µm are permissible in order still to ensure sharp imaging of all the pixels.

SUMMARY OF THE INVENTION

The present invention is based on the technical problem of providing a focal plane plate for a high-resolution camera with housed light-sensitive semiconductor sensors, and a method for adjusting the housed light-sensitive semiconductor sensors on the focal plane plate so that all the pixels of the light-sensitive semiconductor sensors have virtually the same imaging sharpness.

According to an embodiment of the invention, the focal plane plate is designed with adjustment elements at the arrangement locations of the housings of the light-sensitive semiconductor sensors. These adjustment elements can then be processed in a complementary fashion in accordance with the positional deviations of the pixels with regard to the undersides of the housings. The result is that the top side of the housings and thus the sensor pixels lie virtually in one plane E.

Instead of a continuous adjustment element, it is also possible to use a plurality of individual adjustment elements. In order to carry out the adjustment, the housed light-sensitive semiconductor sensors are measured, preferably contactlessly, to determine the position of the surface of the light-sensitive semiconductor sensors with respect to the underside of the housings. The surface of the adjustment elements is subsequently treated by means of material-removing method steps in a complementary fashion with respect to the housing forms such that the pixels of the light-sensitive semiconductor sensors lie approximately in one plane in the assembled state. The housed light-sensitive semiconductor sensors are in this case measured for example by means of a microscope on whose support an end gauge is arranged in a defined manner. The housed light-sensitive semiconductor sensor is then arranged on the end gauge and its surface is measured in terms of height.

In a preferred embodiment, the adjustment elements are designed as parallelepipedal islands or inserts. The parallelepipedal islands may either be formed integrally from the focal plane plate or be arranged as separate elements on the focal plane plate, whereas the inserts are arranged mechanically in cutouts in the focal plane plate. The inserts are preferably attached in a mechanically releasable manner in the cutouts, so that they can be exchanged as required.

In a further embodiment, the housings and the complementarily adapted adjustment elements are permanently connected to one another. On the one hand, this provides a fixed assignment which cannot be lost even in the event of exchange and, on the other hand, this enables good thermal contact between the adjustment elements and the housings, given suitable connecting means. In principle, therefore, the housing and the insert may also be designed in an integral fashion. In this case, the adjustment is effected by means of additional adjustment webs in the cutout in the focal plane plate.

In another embodiment, the focal plane plate is designed with holes which are part of a cooling device. Various implementations are possible for this purpose. On the one hand, the holes may be designed to be continuous, so that, by way of example, a coolant can be pumped through the focal plane plate. A meandering passage through the focal plane plate is also possible but is somewhat more difficult to realize in terms of production engineering. If heat pipes are used for heat dissipation purposes, then the holes need not be continuous but rather reach only as far as the light-sensitive semiconductor sensors. The holes are preferably passed into the adjustment elements, with the result that the heat is dissipated directly at the heat source. In the case where the adjustment elements are designed as inserts the holes in the focal plane plate are made such that they extend into the cutout. The inserts are then likewise designed with a hole. These holes, which are coordinated with one another, then form a continuous duct in which a respective heat pipe can then be arranged.

In yet another embodiment, the focal plane and/or the adjustment elements and/or the housings of the light-sensitive semiconductor sensors are composed of materials which are compatible with respect to expansion, thermal stress that might otherwise adversely affect the adjustment thereby being prevented.

In still a further embodiment, the adjustment elements are composed of a material having a greater thermal conductivity than that of the focal plane plate. This is advantageous whenever the light-sensitive semiconductor sensors are to be kept at an operating temperature which is lower than the ambient temperature. As a result of this, less parasitic heat is coupled from the focal plane plate into the adjustment elements.

This is not necessary in the case of embodiments in which the light-sensitive semiconductor sensors operate at ambient temperature, with the result that the focal plane plate and the adjustment elements and the housings are then preferably composed of the same material. Aluminum nitride ceramics have proved to be a particularly good material.

In a further preferred embodiment, the focal plane plate is plated through in the region of the contact pins. This enables the electronics which are near the sensors to be arranged on the underside of the focal plane plate. As a result of this, on the one hand, an extremely compact unit is produced and, on the other hand, the additional electronics, which also produce a heat loss, are sufficiently decoupled thermally from the light-sensitive semiconductor sensors.

In order to obtain contact pins of sufficient length, the contact pins arranged on the housing are artificially lengthened which enables conductor tracks to be applied to the side areas of the inserts. Additional separate contact pins can then be attached to the conductor tracks in an electrically conductive manner. In this case, the conductor tracks are preferably printed on silver-palladium pastes which have proven to be worthwhile, particularly in the case of aluminum nitride ceramics. In addition, a temperature sensor may be arranged on the adjustment elements which can be used, in particular, for regulating a cooling device. However, the temperature is always a parameter of interest and is therefore desirable to detect The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is explained in more detail below using a preferred exemplary embodiment. In the figures:

FIG. 1 is a side view of the focal plane plate;

FIG. 2 is a side view of different housing forms and the associated islands on the focal plane plate according to an embodiment of the invention;

FIG. 3 is a perspective view of the housing forms and associated islands depicted in FIG. 2;

FIG. 4 is a side view of the components depicted in FIGS. 2 and 3 in the mounted state;

FIG. 5 is a perspective view of the illustration of FIG. 4;

FIG. 7 is a perspective view of an insert for fitting into the focal plane plate shown in FIG. 6 according to an embodiment of the invention, FIG. 8 is an exploded perspective of an insert with a housed CCD linear array and separate contact pins, according to an embodiment of the invention; and FIG. 9 is a perspective view of the insert of FIG. 8 in the assembled state.

DETAILED DESCRIPTION OF THE PRESENTLY PREFERRED EMBODIMENTS

Figure 6:
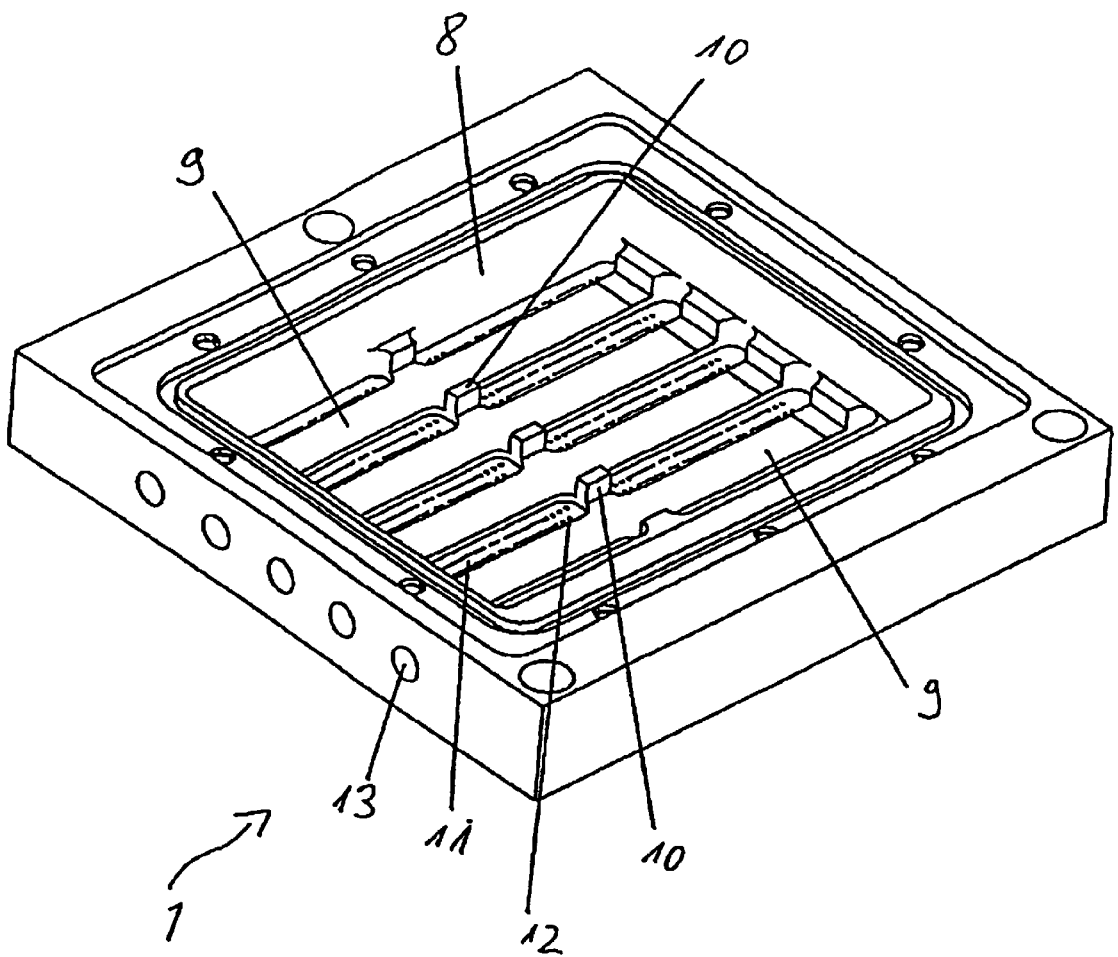
FIG. 6 is a perspective view of a focal plane plate with cutouts according to another embodiment of the invention.

FIG. 1 illustrates a focal plane plate 1 for accommodating housed CCD linear arrays, and being designed with parallelepipedal islands 2 in an integral fashion at the intended mounting locations. FIG. 2 illustrates exemplary housing forms 3–5 of the CCD linear arrays to be mounted. In this case, the housing 3 is somewhat higher than the housing 5, but the top side and underside of housings 3 and 5 are in each case parallel to one another. In contrast to this, the housing 4 is trapezoidal in cross section. The illustrated variations in the form of the housings can either extend over the entire length of the housing or else be locally limited. If the housings 3–5 were mounted on the focal plane plate 1 in accordance with FIG. 1, then all the surfaces of the three CCD linear arrays would lie in different planes. Thus, in order to be able to appropriately rework the islands 2, the respective housing form 3–5 must be determined beforehand. In the simplest case, this can be done manually, for example by means of a micrometer screw, but this is very laborious. It is preferable, therefore, to measure the CCD linear arrays optically.

For this purpose, by way of example, an end gauge is arranged on the support of a microscope. A height measurement of the microscope is adjusted to this exact end gauge, with the result that the same height is always indicated when moving along the end gauge. The housed CCD linear array is subsequently arranged on the end gauge and the surface is measured according to the height. This measurement can be effected continuously or else only at selected reference points. In principle, the exact spatial position is known after the measurement of each sensor pixel. With the spatial positions thus determined, it is then possible to structure the islands 2 by means of grinding, milling or other surface methods such that the CCD linear arrays lie virtually in one plane in the fitted state on the top side. The islands 2 are in this case worked complementarily with respect to the positional deviations of the surface. For the housing forms 3–5 in accordance with FIG. 2, this means that, by way of example, the island 2 of the housing 5 does not have to be worked, the island 2 for the housing 3 has to be ground down by the height difference in a planar manner, and the island 2 for the housing 4 has to be ground obliquely, the results of which are illustrated in FIG. 2.

As illustrated in FIG. 3, islands 2 are designed with plated-through holes 6 in the region of the pins 7 of the CCD linear arrays. A conductor track metalization layer and electronics near the sensors, which are then approximately at the same temperature level as the CCD linear arrays, can then be applied to the underside of the focal plane plate. The focal plane plate 1 is preferably composed of the same material as the housings 3–5, with the result that these are compatible with one another with respect to expansion. On account of the requirements for the housings 3–5 or the focal plane plate 1 to be electrically nonconductive, ceramics having particularly high thermal conductivity are suitable, and in particular aluminum nitride ceramics. In order to improve the dissipation of the heat loss that is generated, the focal plane plate 1 can be thermostatically controlled with the aid of heat pipes or by a flow of liquid. After the adjustment of the islands 2, the CCD linear arrays are soldered into the plated-through holes 6 using solder having a low melting point and are thermally connected to the islands 2 by means of a heat-conducting paste. After fitting, all the surfaces of the CCD components are situated in one plane E, as illustrated in FIGS. 4 and 5.

If the focal plane plate 1 has its temperature actively regulated by means of heat pipes or liquid cooling, then it is correspondingly necessary for a cooling element to take up the dissipated thermal power. By way of example, if the operating temperature is approximately 15–20° C., then focal plane plate 1 takes up additional thermal energy at higher ambient temperatures, which energy has to be dissipated to the cooling element. This in turn leads to an increased energy consumption at the cooling element. In a preferred embodiment, therefore, the focal plane plate 1 is produced from a material having a low thermal conductivity, to which the islands 2 made of a material having high thermal conductivity are then applied. The heat-conducting pipes or the liquid ducts are then preferably inserted only into the parallelepipedal islands 2, with the result that the cooling element essentially takes up only the heat loss of the CCD components.

As a mechanical carrier of the CCD components, the focal plane plate 1 must have a certain thickness for stability reasons, which can lead to a number of problems. On the one hand, the contact pins 7 of the commercially available housings 3–5 for CCD linear arrays are not long enough to be plugged through the focal plane plate 1. On the other hand, the requirement that the ducts for heat dissipation be integrated into islands 2 means that they must have correspondingly larger dimensions. This again conflicts with the problem of the length of the contact pins 7. In a further preferred embodiment, therefore, the adjustment elements are not emplaced in an elevated fashion on the focal plane plate 1 but rather are arranged in cutouts in the focal plane plate 1.

FIG. 6 illustrates a focal plane plate 1 with a basic plane 8 in which essentially a rectangular cutout 9 has been incorporated. Parallelepipedal webs 10 project from the base area of the cutout 9. Inserts with the housed CCD linear arrays are arranged in each case between webs 10, which provide mechanical stabilization. There are further cutouts 11 in the region of the contact pins in the fitted state. Plated-through holes 12 to the underside of the focal plane plate 1 are arranged in the further cutouts 11. Furthermore, the focal plane plate 1 is designed with holes 13 extending from the outer side to a point in the cutout 9.

An insert 14, as illustrated in FIG. 7, can then be inserted into the cutout 9 and connected to the focal plane plate 1 in a mechanically releasable manner. The insert 14 is designed to be essentially parallelepipedal and includes a hole 15 corresponding to hole 13 in the focal plane plate 1. In the fitted state, hole 15 and 13 form a duct. On the top side 16, insert 14 is designed with a chamfer 17 on the two side areas 18.

Conductor tracks 19, which are partly illustrated in FIG. 8, are applied to the side areas 18 of the insert 14.

Furthermore, supply lines 20 for a temperature sensor 21 are applied on at least one side area 18. In this case, the conductor tracks 19 and supply lines 20 are preferably printed onto the side areas 18 of the insert 14 using, for example, silver-palladium pastes. The housed CCD component 22 is then emplaced on the surface 16 of the insert 14 and attached in a releasable manner. The CCD component 22 shown in FIG. 8 comprises three monolithically integrated CCD linear arrays 23. After housing 3 with the contact pins 7 has been placed onto the surface 16, the contact pins 7 are electrically connected to the conductor tracks 19. In addition, separate contact pins 24 are attached to the conductor tracks 19 in an electrically conductive manner. To that end, the contact pins 24 may be soldered to the conductor tracks 19 or connected by means of a conductive adhesive.

FIG. 9 illustrates the insert 14 with the housing 3, in which the CCD component 22 is attached, and the separate contact pins 24 in the assembled state. In this case, contact pins 7 are artificially lengthened by the conductor tracks 19 and the separate contact pins 24. If housings 3 with contact pins 7 of sufficient length can be obtained, it is possible, of course, to dispense with the conductor tracks 19 and the separate contact pins 24. In the assembled state, inserts 14 are then inserted into the cutouts 9 in the focal plane plate 1 and temporarily fixed for example by means of adhesive bonding points. By way of example, four inserts 14 would be inserted into the focal plane plate 1 in accordance with FIG. 6. The contact pins 7 which are plugged together with the separate contact pins 24 are inserted into the plated-through holes 12 and connected to the electronics near the sensors on the underside.

Prior to fitting, the CCD components 22 are optically measured again. The inserts 14 are then worked on the top side 16 analogously to the islands by means of material-removing methods such that all of the CCD components 22 lie virtually in one plane. In this case, chamfer 17 ensures that the conductor tracks 19 are not damaged during the treatment of the surface. Each insert 14 then forms a fixedly assigned unit with its housing 3. Therefore, these inserts can then subsequently be fixedly and adhesively bonded to one another, which is necessary for good thermal coupling. It is not only the case that one insert 14 with its housing 3 forms a unit, rather all four inserts 14 inserted into the focal plane plate form a set that is precisely coordinated with one another. The inserts 14 worked to completion and connected to the housings 3 can then be inserted into the focal plane plate 1 and be connected in a mechanically releasable manner. By virtue of the mechanically releasable connection to the focal plane plate 1, the latter can be equipped with different sets of CCD components 22 for different applications.

The invention is not limited by the embodiments described above which are presented as examples only but can be modified in various ways within the scope of protection defined by the appended patent claims.

We claim:

1. A focal plane plate for a high resolution camera with light-sensitive semiconductor sensors comprising:
   housings for the light sensitive semiconductor sensors, said housings having a form; and
   adjustment elements arranged on the focal plane plate at arrangement locations of said housings, said adjustment elements having a form complementary to the form of said housings.

2. The focal plane plate in accordance with claim 1, wherein said adjustment elements comprise one from a group consisting of parallelepipedal islands and inserts.

3. The focal plane plate in accordance with claim 2, further comprising cutouts for releasably receiving said inserts.

4. The focal plane plate in accordance with claim 3, wherein said housings are permanently connected to the complementarily adapted adjustment elements.

5. The focal plane plate in accordance with claim 3, wherein said housings and associated inserts are integrally formed.

6. The focal plane plate in accordance with claim 3, further comprising adjustment webs arranged in said cutouts in the focal plane plate.

7. The focal plane plate in accordance with claim 3, further comprising focal plane plate holes adapted to receive heat pipes for passing coolant therethrough.

8. The focal plane plate in accordance with claim 7, wherein said focal plate holes are arranged to pass through one of said islands and said cutouts, said inserts further comprising insert holes, wherein said focal plate holes form a duct with said insert holes.

9. The focal plane plate in accordance with claim 1, wherein the focal plane plate and said adjustment elements comprise a expansion compatible material with respect to said housings.

10. The focal plane plate in accordance with claim 9, wherein said adjustment elements comprise a first material and the focal plane plate comprises a second material, said first material having a greater thermal conductivity than said second material.

11. The focal plane plate in accordance with claim 9, wherein said housings, said adjustment elements and the focal plane plate are composed of the same material.

12. The focal plane plate in accordance with claim 9, wherein said housings, said adjustment elements and the focal plane plate are composed of aluminum nitride ceramic.

13. The focal plane plate in accordance with claim 1, wherein the light-sensitive semiconductor sensors comprise contact pins and the focal plane plate is plated in a region of said contact pins.

14. The focal plane plate in accordance with claim 13, wherein said inserts further comprise side walls having conductor tracks electrically connectable to said contact pins, and separate contact pins for extending a length of said contact pins.

15. The focal plane plate in accordance with claim 14, wherein said conductor tracks comprise silver-palladium paste printed onto said inserts.

16. The focal plane plate in accordance with claim 1, further comprising a temperature sensor arranged on said adjustment elements.

17. The focal plane plate in accordance with claim 15, wherein said inserts further comprise a top side having chamfered edges.

18. The focal plane plate in accordance with claim 14, wherein said cutouts further comprise additional cutouts in a region of said contact pins, said additional cutouts comprising plated-through holes.

19. The focal plane plate in accordance with claim 1, wherein the light-sensitive semiconductor sensors comprise electronic circuitry arranged on an underside of the focal plane plate.

* * * * *